Feb. 18, 1964 E. B. DICKISON 3,121,655
APPARATUS FOR FORMING RINGS FROM FLEXIBLE TUBING
Filed July 11, 1961 4 Sheets-Sheet 4

INVENTOR
E. B. DICKISON
BY
ATTORNEY

Patent 3,121,655

United States Patent Office

3,121,655
APPARATUS FOR FORMING RINGS FROM FLEXIBLE TUBING
Earl B. Dickison, Indianapolis, Ind., assignor to Western Electric Company, Incorporated, a corporation of New York
Filed July 11, 1961, Ser. No. 123,211
6 Claims. (Cl. 156—503)

This invention relates to apparatus for forming rings from flexible tubing, and more particularly to apparatus for inserting one end of a length of flexible tubing into the other end thereof to form a ring. It is an object of the invention to provide improved apparatus of such character.

In the forming of a ring from a length of flexible tubing, the tube is most conveniently supplied in a substantially straight length. More specifically, a supply of tubing of indefinite length may be intermittently fed to a suitable cutter which clips off tubing of prescribed lengths, the lengths of tubing as severed from the supply most conveniently being laid out in a straight line. Apparatus for forming a ring of such a straight length of tubing must necessarily cause relative rotation of the two end portions of the tubing through a total angle of 360° and bring the two end portions into alignment, with their free extremities projecting toward each other. This must be accomplished without stretching the tubing beyond its elastic limit and preferably without stretching the tubing beyond its normal length. It has been found that such relative movement of the ends of a length of tubing is not practical with simple rotary movement although, as is apparent, rotary movement must be involved in order to produce the necessary relative rotation of the end portions of the tubing through an angle of 360°.

According to the present invention, the necessary movement of the end portions of a length of tubing is accomplished through combined relative rotational and relative linear movement of the two ends of the tubing. The relative rotary movement, of itself, first calls for movement of the tube ends away from each other, the component of movement of the tube ends away from each other being compensated for by linear movement of the tube ends toward each other. Following relative rotation of the tube ends through a total angle of approximately 180°, the relative rotary movement of the tube ends includes a component of movement of the ends toward each other, this component adding to the continued linear movement of the tube ends toward each other. Preferably, relative rotation through 360° of the tube ends is completed with the tube ends spaced slightly apart, following which, continued linear movement of the tube ends toward each other results in insertion of one tube end within the other to complete the formation of a ring.

In accordance with the preferred embodiment of the invention, clamps are provided for gripping a length of tubing near opposite ends thereof with self-supporting end lengths of the tubing extending beyond the clamps. The clamps are rotated about respective shafts first away from each other and subsequently toward each other, the shafts simultaneously moving linearly along converging paths. More particularly, movement of the shafts along converging paths causes rotation of the clamps through cooperation of pinions on the shafts with racks which extend along the paths of the shafts. Accordingly, as actuating means move the shafts along their linear paths, the clamps are simultaneously rotated through 180° each such that the end lengths of the tubing which extend beyond the clamps are brought into alignment with their free extremities projecting toward each other. Further linear movement of the shafts, without rotation of the clamps, then moves the ends of the tubing into telescoping relationship.

It is another object of the invention to provide improved apparatus for forming rings from lengths of flexible tubing wherein one end of a length of tubing is inserted into the other end without, at any time, stretching the length of tubing beyond its normal length.

It is a further object of the invention to provide improved apparatus for forming rings from lengths of flexible tubing wherein both free ends of the length of tubing are rotated through an angle of 180° while, at the same time, being moved linearly toward each other such that the rotary movement may not cause stretching of the tubing.

It is a still further object of the invention to provide improved apparatus for forming rings from lengths of flexible tubing, the machine having various of the characteristics set forth above while being simple and rugged in construction, efficient and reliable in operation, and economical to manufacture.

This invention, together with further objects and advantages thereof, will best be understood by reference to the following description taken in connection with the accompanying drawings, in which.

Figure 1:
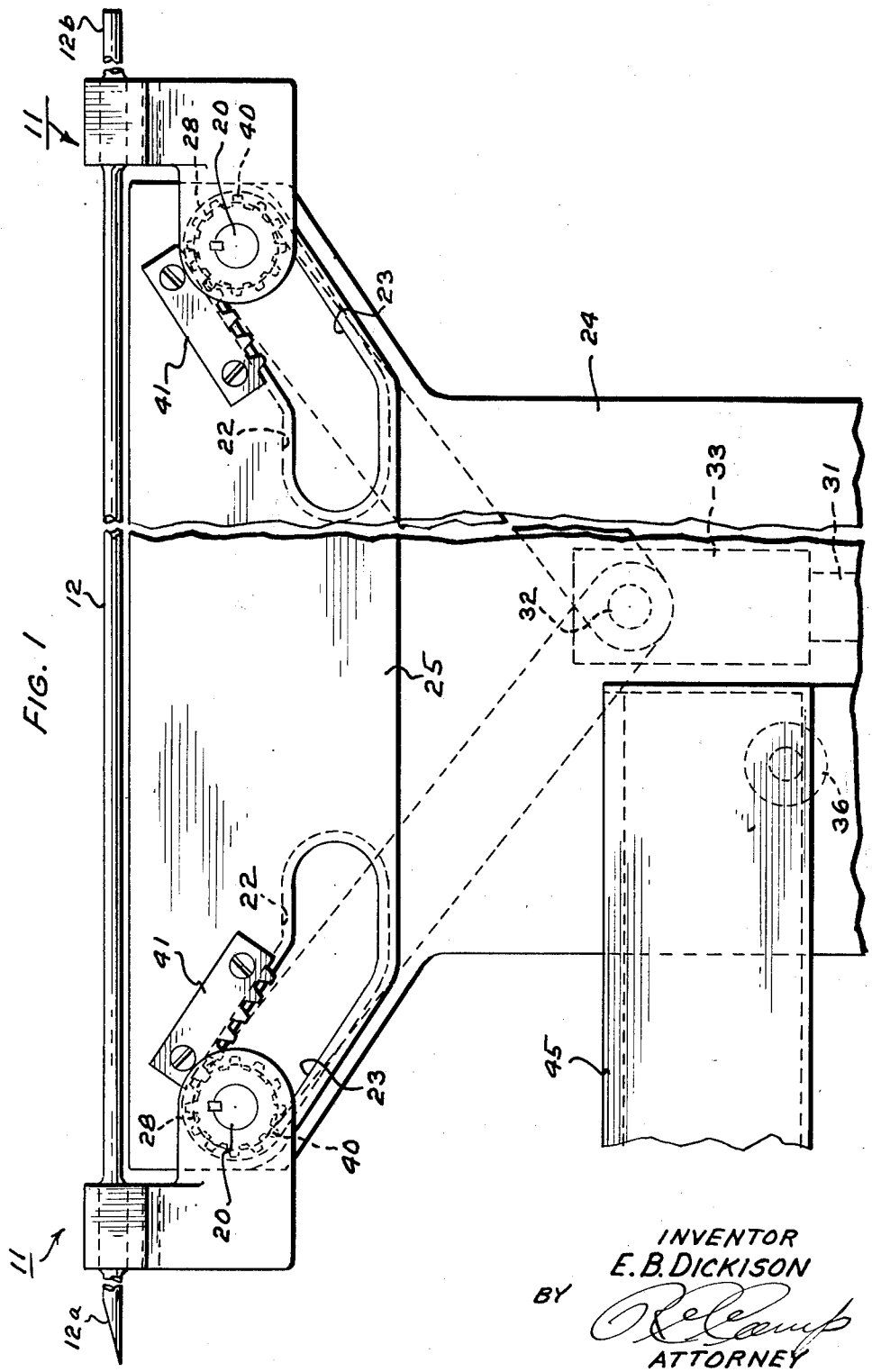
FIG. 1 is a front elevational view of apparatus illustrating one embodiment of the invention.

The apparatus illustrated in the drawings and incorporating the present invention is intended to have lengths of tubing fed thereto, the tubing being of a prescribed length and being placed with precision in the apparatus. The lengths of tubing may be fed to the present apparatus manually, or an automatic machine may be employed, either integral with the present apparatus or merely associated therewith, to advance tubing intermittently, to sever prescribed lengths of tubing from the supply, and to feed the severed lengths to the present apparatus. Since the present apparatus, and the invention incorporated therein is not affected by the method of or apparatus for feeding severed lengths of tubing accurately thereto, such methods or apparatus are not shown in the drawings or described herein.

The apparatus shown in the drawings includes a pair of clamps 11 for gripping a length of tubing 12 near opposite ends thereof. As may be seen best in FIG. 1, end lengths 12a and 12b of the tubing extend beyond the clamps 11 such that they may readily be brought into telescoping relationship to form a ring.

It is necessary that these end lengths of tubing be sufficiently short that they are self supporting whereby they extend in directions determined by the clamps 11. The permissible length of these protruding end lengths of tubing is, of course, a function of the flexibility and weight of the tubing, as well as the degree of accuracy required to effect the telescoping of the ends of the tubing. In the case of tubing composed of conventional synthetic plastics and having reasonable wall thickness relative to tube diameter, the end lengths of tubing protruding beyond the clamps may be several times as long as the diameter of the tubing while being sufficiently self supporting that telescoping of the two ends may be effected consistently. This is particularly true where one end of the tubing is cut at a sharply acute angle as at 12a, and, further, where the other end is artificially flared, as at 12b.

Figure 2:
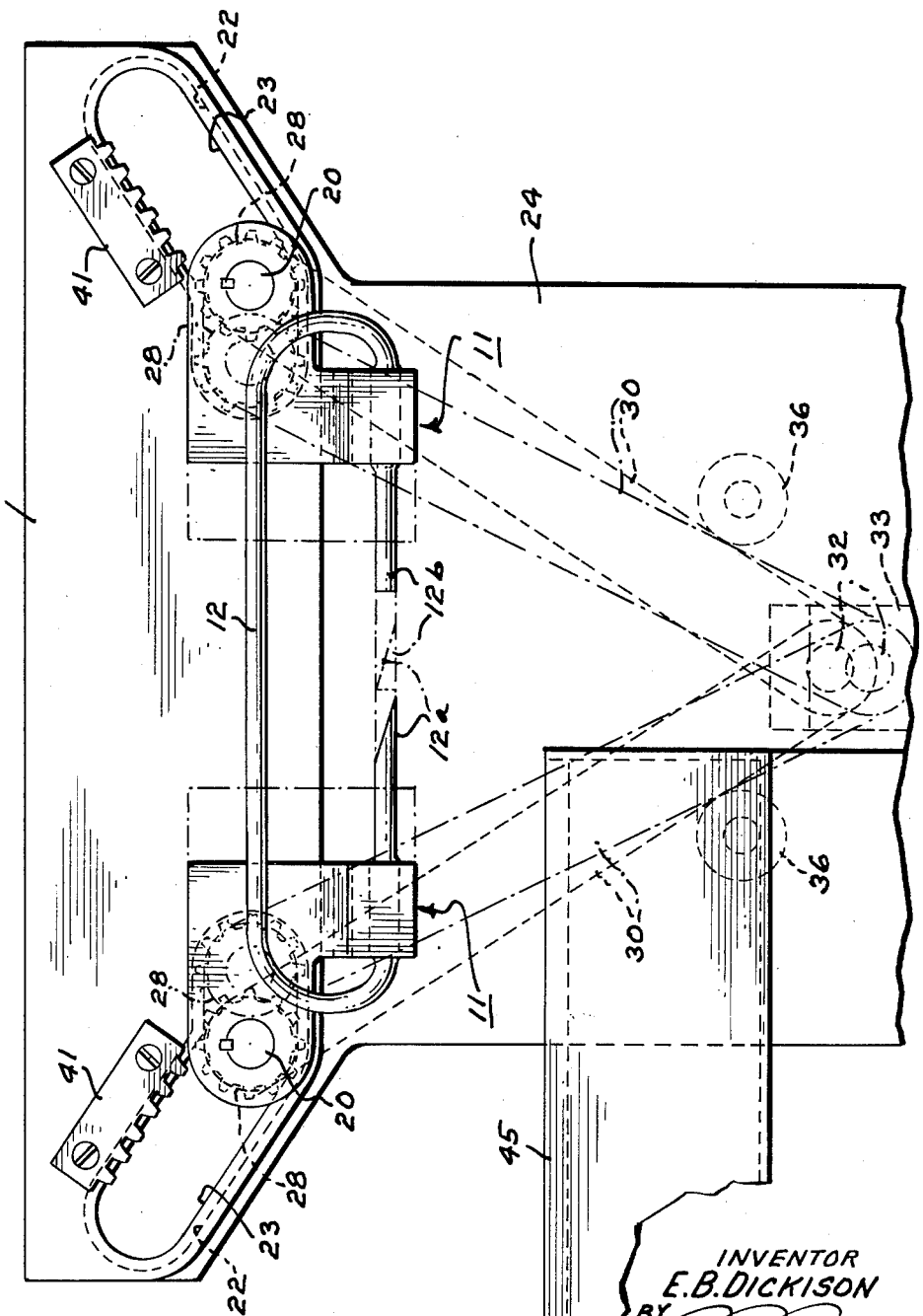
FIG. 2 is a similar view of the same apparatus, the solid lines illustrating the apparatus in a different operating position than illustrated in FIG. 1 and the phantom lines illustrating still another operating position.
Figure 3:
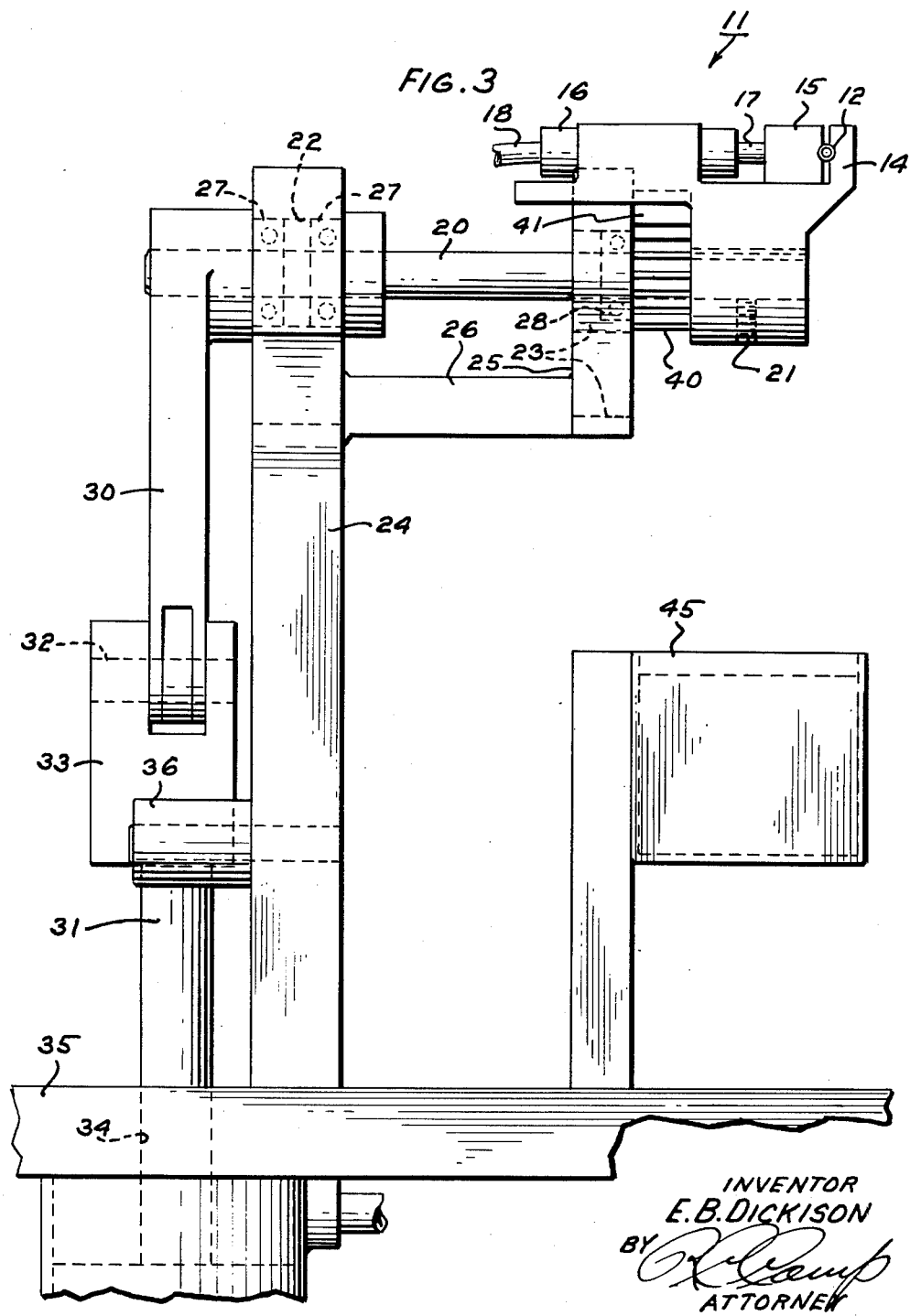
FIG. 3 is a side elevational view of the apparatus in the position of FIG. 1.

It is the purpose of the apparatus to turn these end lengths 12a and 12b of the tubing through 180° each and bring them into alignment as shown by the solid lines in FIG. 2, and then to move them together and into telescoping relationship as shown by the phantom lines in FIG. 2.

Each of the clamps 11 includes a fixed jaw 14 and a movable jaw 15 between which the tubing 12 is received and gripped. Mounted on the fixed jaw 14 is an air cylinder 16 for actuating the movable jaw 15 through a piston rod 17. Apparatus for controlling the flow of air to the air cylinder 16 through an air tube 18 may be of conventional form and does not of itself constitute a feature of the present invention. Accordingly, it is not shown in the drawings or described in detail herein. It is sufficient for the purpose of understanding the present invention that it be appreciated that the operation of the air cylinder is either under the control of the operator or is automatically controlled to cause gripping of the tubing 12 when a length of the tubing is properly placed between the fixed and movable jaws 14 and 15. Since the clamps 11 are movable in a manner described immediately below, the air tube 18 is preferably flexible.

Each clamp 11 is mounted on a shaft 20 and is secured thereto as by means of a set screw 21. Each shaft 20 is arranged for movement laterally of itself within slots 22 and 23 in fixed frame members 24 and 25, respectively, these two frame members being secured to each other by tie bars 26. More particularly, each shaft 20 is provided with two sets of roller bearings 27 arranged within the slot 22, and another set of roller bearings 28 arranged within the slot 23, these bearings permitting substantially frictionless movement of the shafts along the slots 22 and 23.

Such movement of the shafts 20 is effected through links 30 which are rotatably connected to corresponding ones of the shafts 20. As seen best in FIGS. 1 and 2, the links 30 extend from the corresponding shafts 20 to a common point where they are pivotally connected to an actuating shaft 31 through a pin 32 and a clevis 33. The shaft 31 is limited to vertical linear movement by virtue of its extending through an opening 34 in a base plate 35. The shaft 31 may be operated either manually or by any suitable automatic actuating means such as an air cylinder, not shown.

It may now be seen that if the actuating shaft 31 is drawn downward, the shafts 20 will be drawn from the upper, outer ends of the slots 22 and 23 to the lower, inner ends thereof. It will be noted that the slots 22 and 23 include short, substantially horizontal portions at their lower, inner ends. When the shafts 20 move along these horizontal portions of the slots, they will be moving directly toward each other. In order to facilitate this latter movement, rollers 36 are rotatably supported on the frame member 24 along opposite sides of the actuating shaft 31. When the shafts 20 reach the horizontal portions of the corresponding slots 22 and 23, the outer edges of the links 30 engage the rollers 36 such that the links are forcibly pivoted toward each other with further movement of the actuating shaft 31.

Also secured to each shaft 20 is a pinion 40 which is operatively engageable with a rack 41, the two racks being secured to the frame member 25 and extending along the paths of the corresponding pinions. It will be apparent that as the shafts 20 are moved laterally of themselves along the slots 22 and 23 by the actuating shaft 31, the pinions 40 and hence the shaft 20 and the clamps 11 will be rotated. More particularly, the righthand clamp as viewed in FIGS. 1 and 2, will be rotated in a clockwise direction while the lefthand clamp will be rotated in a counterclockwise direction. At the time that the pinions 40 are moved beyond the inner or lower ends of the corresponding racks 41, the pinions and hence the clamps will have been rotated from the positions of FIG. 1 to the positions shown in the solid lines in FIG. 2, this comprising a rotation of 180° for each clamp. The end lengths 12a and 12b of the tubing are then in alignment with each other with their free extremities projecting toward each other. Further movement of the shafts 20 to the inner or lower ends of the slots 22 and 23 moves the clamps directly toward each other with no further rotation thereof, whereby the end lengths of the tube are brought into telescoping relationship.

Figure 4:
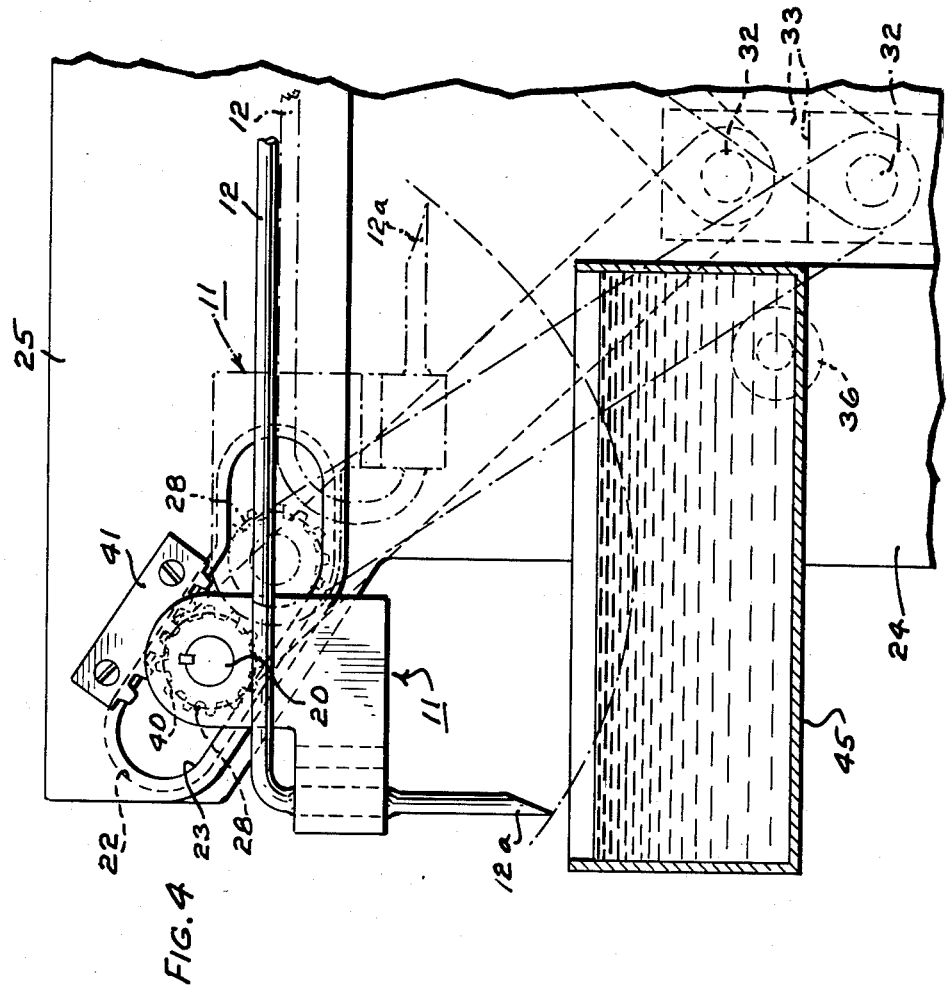
FIG. 4 is a front elevational view of the lefthand portion of the apparatus of FIG. 1 illustrating the path of movement of one tube end into and out of an open topped adhesive container.

Arranged generally below the lefthand clamp 11 is an open-topped container 45 for holding a quantity of liquid adhesive. As may be seen best in FIG. 4, the end length 12a of the tubing 12 is caused first to dip into the container 45 and then to rise out of the container during the downward movement of the actuator shaft 31. More particularly, the rotary movement of the lefthand clamp 11 combined with the associated linear movement thereof causes the free extremity of the lefthand end of the tube to follow the arcuate path indicated in FIG. 4, this path leading into and out of the container 45. The resulting dipping of the tapered extremity of the tubing 12 into the bath of adhesive causes adherence of the telescoped ends of the tube.

In order that the illustrated embodiment of the invention may be more fully understood, a description of a complete operating cycle of the machine follows. With the apparatus in the position illustrated in FIG. 1 and with the movable jaws 15 of the clamps 11 withdrawn, a length of tubing 12 is laid between the jaws. The air cylinders 16 are then actuated to close the clamps on the length of tubing.

The actuating shaft 31 is then drawn downward whereby the links 30 draw the shafts 20 along the corresponding slots 22 and 23. At the same time the clamps are rotated by virtue of the engagement of the pinions 40 with the racks 41. More specifically, the tube engaging portions of the clamps are initially rotated away from each other. However, the shafts move linearly toward each other sufficiently that the component of movement of the tube ends away from each other, resulting from rotation of the clamps, is offset by the component of movement of the tube ends toward each other, resulting from linear movement of the clamps.

When the pinions 40 pass off the ends of the racks 41, rotation of the clamps 11 discontinues, the clamps having rotated through an angle of 180° each to the positions illustrated by the solid lines in FIG. 2. Further downward movement of the actuating shaft 31 causes movement of the shafts 20 along the horizontal portions of corresponding slots 22 and 23, this movement being abetted by engagement of the links 30 with the rollers 36. This linear movement of the shafts 20 moves the tube ends into telescoping relationship as indicated by the phantom lines in FIG. 2, there being no rotation of the clamps during this portion of the operating cycle.

During the latter half of the rotary movement of the lefthand clamp 11, the lefthand free extremity of the tubing 12 is dipped into the adhesive within the container 45, this preferably being the tapered end of the tube, which is inserted into the other end of the tube.

The clamps 11 may then be released to drop the looped tubing before the return of the apparatus to its original position through upward movement of the actuating shaft 31. Upon return of the apparatus to its original position it is in readiness for another operating cycle.

It may now be seen that by providing linear motion for the shafts about which the clamps rotate, the component of relative motion of the tube engaging portions of the clamp away from each other, produced by the rotary motion, is offset such that the tube is never extended beyond its normal length. In this manner the illustrated apparatus may receive lengths of tubing extending along a substantially straight line and turn the two ends through a total angle of 360° relative to each other such that they may be brought into telescoping relationship. It will be apparent also that the apparatus is inherently simple and rugged in construction, efficient and reliable in operation, and economical to manufacture.

While one specific embodiment of the invention has been disclosed, many modifications will be apparent, and it is intended that the invention be interpreted as including all modifications which fall within the true spirit and scope of the invention.

What is claimed is:

1. Apparatus for forming rings from lengths of flexible tubing, comprising a pair of clamps for releasably gripping a substantially straight length of tubing near opposite ends thereof with self-supporting end lengths of the tubing extending beyond said clamps in directions determined by the tube-engaging portions of said clamps, a pair of shafts supporting respective ones of said clamps for rotary movement about axes spaced substantially from the tube engaging portions thereof, actuating means for moving said shafts laterally of themselves along converging paths alternately toward and away from each other, means arranged in part fixedly along the paths of movement of said shafts and in part coaxial with said shafts and non-rotatable with respect to corresponding ones of said clamps for causing rotation of said clamps with the tube engaging portions of said clamps initially rotating away from each other as said shafts are moved toward each other by said actuating means, such that the end lengths of tubing as supported by said clamps are moved together and brought into alignment with their free extremities projecting toward each other, and means for releasing said clamps.

2. Apparatus for forming rings from lengths of flexible tubing, comprising a pair of clamps for releasably gripping a substantially straight length of tubing near opposite ends thereof with self-supporting end lengths of the tubing extending beyond said clamps in directions determined by the tube-engaging portions of said clamps, a pair of shafts supporting respective ones of said clamps for rotary movement about axes spaced substantially from the tube engaging portions thereof, actuating means for moving said shafts laterally of themselves along converging paths alternately toward and away from each other, a pair of pinions coaxial with corresponding ones of said shafts and non-rotatable with respect to corresponding ones of said clamps, a pair of racks fixedly positioned along the paths of movement of said shafts and cooperable with respective ones of said pinions to cause rotation of said pinions and of said clamps with the tube engaging portions of said clamps initially rotating away from each other as said shafts are moved toward each other by said actuating means, such that the end lengths of tubing as supported by said clamps are moved together and brought into alignment with their free extremities projecting toward each other, and means for releasing said clamps.

3. Apparatus for forming rings from lengths of flexible tubing, comprising a pair of clamps for releasably gripping a substantially straight length of tubing near opposite ends thereof with self-supporting end lengths of the tubing extending beyond said clamps in directions determined by the tube-engaging portions of said clamps, a pair of parallel shafts supporting respective ones of said clamps for rotary movement about axes spaced substantially from the tube engaging portions thereof and lying in planes perpendicular to the end lengths of tubing as supported by the respective clamps, actuating means for moving said shafts laterally of themselves along converging paths alternately toward and away from each other, a pair of pinions coaxial with corresponding ones of said shafts and non-rotatable with respect to corresponding ones of said clamps, a pair of racks fixedly positioned along the paths of movement of said shafts and cooperable with respect ones of said pinions to cause rotation of said pinions and of said clamps with the tube engaging portions of said clamps initially rotating away from each other as said shafts are moved toward each other by said actuating means, such that the end lengths of tubing as supported by said clamps are moved together and brought into alignment with their free extremities projecting toward each other, and means for releasing said clamps.

4. Apparatus as specified in claim 3 wherein said actuating means move said shafts along converging paths, a portion of the paths extending toward each other beyond the corresponding ends of said racks, whereby the final portion of the movement of said clamps and of the end lengths of the tubing toward each other is effected solely by movement of said shafts laterally of themselves without rotation of said pinions and of said clamps by said racks.

5. Apparatus as specified in claim 3 wherein said actuating means include an actuator element confined to movement along a line bisecting and perpendicular to a line drawn between and perpendicular to said shafts, a pair of links each pivotally connected at one end to said actuator element and connected at their other ends to respective ones of said shafts, and means for guiding said shafts along converging paths, whereby movement of said actuator element causes movement of said shafts along said guide means.

6. Apparatus for forming rings from lengths of flexible tubing, comprising a pair of clamps for releasably gripping a substantially straight length of tubing near opposite ends thereof with self-supporting end lengths of the tubing extending beyond said clamps in a substantially common horizontal direction determined by the tube-engaging portions of said clamps, a pair of shafts supporting respective ones of said clamps for rotary movement about horizontal axes spaced substantially from the tube engaging portions thereof and lying in planes perpendicular to the end lengths of tubing as supported by said clamps, actuating means for moving said shafts laterally of themselves alternately obliquely downward and toward each other and obliquely upward and away from each other, an open top container located below one of said clamps for containing liquid adhesive, a pair of pinions coaxial with corresponding ones of said shafts and non-rotatable with respect to corresponding ones of said clamps, a pair of racks fixedly positioned along the paths of movement of said shafts and cooperable with respective ones of said pinions to cause rotation of said pinions and of said clamps with the tube engaging portions of said clamps rotating on a path of movement first away from each other and downward and then toward each other and upward as said shafts are moved obliquely downward and toward each other by said actuating means, such that the end lengths of tubing as supported by said clamps are moved together and brought into alignment with their free extremities projecting toward each other, and such that the resulting path of movement of said clamp causes the free extremity of one end of the tubing to move into and out of said container through the open top thereof, and means for releasing said clamps.

References Cited in the file of this patent

UNITED STATES PATENTS

| | | |
|---|---|---|
| 2,148,748 | Hardy | Feb. 28, 1939 |
| 2,379,500 | Steffens | July 3, 1945 |